US012555878B2

(12) United States Patent
Yoshii et al.

(10) Patent No.: US 12,555,878 B2
(45) Date of Patent: Feb. 17, 2026

(54) SECONDARY BATTERY AND INSULATING MEMBER

(71) Applicant: Panasonic Intellectual Property Management Co., Ltd., Osaka (JP)

(72) Inventors: Kazuhiro Yoshii, Osaka (JP); Satoru Tachibana, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 547 days.

(21) Appl. No.: 17/435,232

(22) PCT Filed: Dec. 18, 2019

(86) PCT No.: PCT/JP2019/049640
§ 371 (c)(1),
(2) Date: Aug. 31, 2021

(87) PCT Pub. No.: WO2020/179190
PCT Pub. Date: Sep. 10, 2020

(65) Prior Publication Data
US 2022/0149496 A1    May 12, 2022

(30) Foreign Application Priority Data
Mar. 4, 2019   (JP) .................................. 2019-038418

(51) Int. Cl.
*H01M 50/593*   (2021.01)
*H01M 50/54*    (2021.01)
*H01M 50/586*   (2021.01)

(52) U.S. Cl.
CPC ......... *H01M 50/593* (2021.01); *H01M 50/54* (2021.01); *H01M 50/586* (2021.01)

(58) Field of Classification Search
CPC ... H01M 50/593; H01M 50/54; H01M 50/586
See application file for complete search history.

(56) References Cited

U.S. PATENT DOCUMENTS

2014/0120417 A1*   5/2014   Matsushita ............... B60L 7/10
                                                          429/211
2018/0159136 A1    6/2018   Shiozaki et al.
(Continued)

FOREIGN PATENT DOCUMENTS

CN   108281609 A  *  7/2018  ........ H01M 10/0525
CN   108886130 A     11/2018
(Continued)

OTHER PUBLICATIONS

Machine English translation of WO 2017/163933 A1 (Year: 2017).*
(Continued)

*Primary Examiner* — Matthew T Martin
*Assistant Examiner* — Katherine N Higgins
(74) *Attorney, Agent, or Firm* — WHDA, LLP

(57) ABSTRACT

This secondary battery is characterized by being provided with: a positive electrode; and a positive electrode lead that is connected to the positive electrode, wherein the positive electrode has a positive electrode collector and a positive electrode active material layer formed in at least one surface of the positive electrode collector, at least one of the surfaces of the positive electrode has a laminated part in which the positive electrode active material layer is formed, and an exposed part in which the positive electrode collector is exposed, and the positive electrode lead has an one-end part connected to the exposed part and an extended part which extends from the one-end part to the outside of the positive (Continued)

electrode. The secondary battery is further provided with an insulating member that has a base material part, a heat resistant and an adhesive part.

17 Claims, 3 Drawing Sheets

(56) References Cited

U.S. PATENT DOCUMENTS

| | | | |
|---|---|---|---|
| 2018/0337383 A1 | 11/2018 | Tanabe et al. | |
| 2019/0097228 A1* | 3/2019 | Kobayashi | H01M 10/4235 |
| 2019/0189998 A1* | 6/2019 | Muroya | H01M 50/588 |
| 2020/0303782 A1 | 9/2020 | Yatomi | |
| 2020/0373582 A1* | 11/2020 | Nishino | H01M 4/626 |
| 2022/0140415 A1 | 5/2022 | Tachibana | |

FOREIGN PATENT DOCUMENTS

| | | | | |
|---|---|---|---|---|
| CN | 113348590 A | | 9/2021 | |
| JP | H09147928 A | * | 6/1997 | |
| JP | 11-135110 A | | 5/1999 | |
| JP | 2004-311282 A | | 11/2004 | |
| JP | 2014-89856 A | | 5/2014 | |
| JP | 2018-195535 A | | 12/2018 | |
| KR | 20070074390 A | * | 7/2007 | H01M 50/572 |
| WO | 2017/038010 A1 | | 3/2017 | |
| WO | 2017/163932 A1 | | 9/2017 | |
| WO | WO-2017163933 A1 | * | 9/2017 | H01M 10/0431 |
| WO | WO-2019044168 A1 | * | 3/2019 | H01M 10/0431 |
| WO | WO-2019130783 A1 | * | 7/2019 | H01M 10/0431 |
| WO | WO-2020241410 A1 | * | 12/2020 | H01M 10/0587 |

OTHER PUBLICATIONS

English Machine Translation of WO 2019/130783 (Year: 2019).*
English Machine Translation of WO 2019/044168 (Year: 2019).*
English Machine Translation of WO 2020/241410 (Year: 2020).*
English Machine Translation for CN-108281609-A (Year: 2018).*
English Machine Translation for KR-20070074390-A (Year: 2007).*
English Machine Translation for JP H09147928 A (Year: 1997).*
English Machine Translation for WO-2017163933-A1 (Year: 2017).*
English Machine Translation for WO-2019044168-A1 (Year: 2019).*
The Extended European Search Report dated Mar. 29, 2022, issued in counterpart to EP Application No. 19917910.2. (8 pages).
International Search Report dated Mar. 17, 2020, issued in counterpart International Application No. PCT/JP2019/049640 (2 pages).
English Translation of Chinese Search Report dated Oct. 16, 2023, issued in counterpart CN application No. 201980092321.X. (3 pages).
English Translation of Chinese Search Report dated Apr. 29, 2024, issued in counterpart CN application No. 201980092321.X (2 pages).

* cited by examiner

SECONDARY BATTERY AND INSULATING MEMBER

TECHNICAL FIELD

The present disclosure relates to a secondary battery and to an insulating member.

BACKGROUND ART

From a viewpoint of securing safety of a secondary battery, a structure is being considered in which a short-circuiting portion does not tend to easily expand even when internal short-circuiting occurs, so that heat generation is suppressed. The internal short-circuiting may occur with a starting point at a location on an exposed portion of a positive electrode current collector where a positive electrode lead is connected. Patent Literature 1 discloses that, with a use of an insulating member in which an adhesive layer contains an adhesive agent and an insulating inorganic material, the heat generation can be suppressed even when the internal short-circuiting occurs due to a foreign object which is conductive.

CITATION LIST

Patent Literature

PATENT LITERATURE 1: International Publication No. WO 2017/038010

SUMMARY

However, when the adhesive agent and the insulating inorganic material are mixed, an adhesion strength of the adhesive layer may be reduced, and the adhesive layer may thus be peeled off. Therefore, there remains room of improvement in maintaining the adhesiveness of the insulating member.

An advantage of the present disclosure lies in provision of a secondary battery in which the peeling-off of the insulating member from the positive electrode is suppressed, and the heat generation is suppressed even when the internal short-circuiting occurs due to a conductive foreign object.

According to one aspect of the present disclosure, there is provided a secondary battery including: a positive electrode; and a positive electrode lead connected to the positive electrode, wherein the positive electrode includes a positive electrode current collector, and a positive electrode active material layer formed over at least one surface of the positive electrode current collector, at least one surface of the positive electrode includes a layered portion in which the positive electrode active material layer is formed, and an exposed portion in which the positive electrode current collector is exposed, the positive electrode lead includes a one-end portion connected to the exposed portion, and an extended portion which extends from the one-end portion to an outer side of the positive electrode, the secondary battery further includes an insulating member including a base member portion, a heat resistive portion formed over a part of one surface of the base member portion and containing an insulating inorganic material, and an adhesive portion which covers at least a part of each of surfaces of the base member portion and the heat resistive portion, and the insulating member is placed over a surface of the positive electrode in such a manner that the heat resistive portion opposes an outer surface of the one-end portion.

According to another aspect of the present disclosure, there is provided an insulating member which is placed to oppose a part of a positive electrode lead connected to a surface of a positive electrode, the insulating member including: a base member portion; a heat resistive portion formed over a part of one surface of the base member portion, and containing an insulating inorganic material; and an adhesive portion which covers at least a part of each of surfaces of the base member portion and the heat resistive portion.

According to the present disclosure, the peeling-off of the insulating member from the positive electrode can be suppressed, and the heat generation can be suppressed even when the internal short-circuiting occurs due to a conductive foreign object.

DESCRIPTION OF EMBODIMENTS

An embodiment of the present disclosure will now be described in detail. In the present disclosure, a vertical direction of a page of each of FIGS. 1, 3, and 4 may be referred to by "up" and "down" directions.

Figure 1:
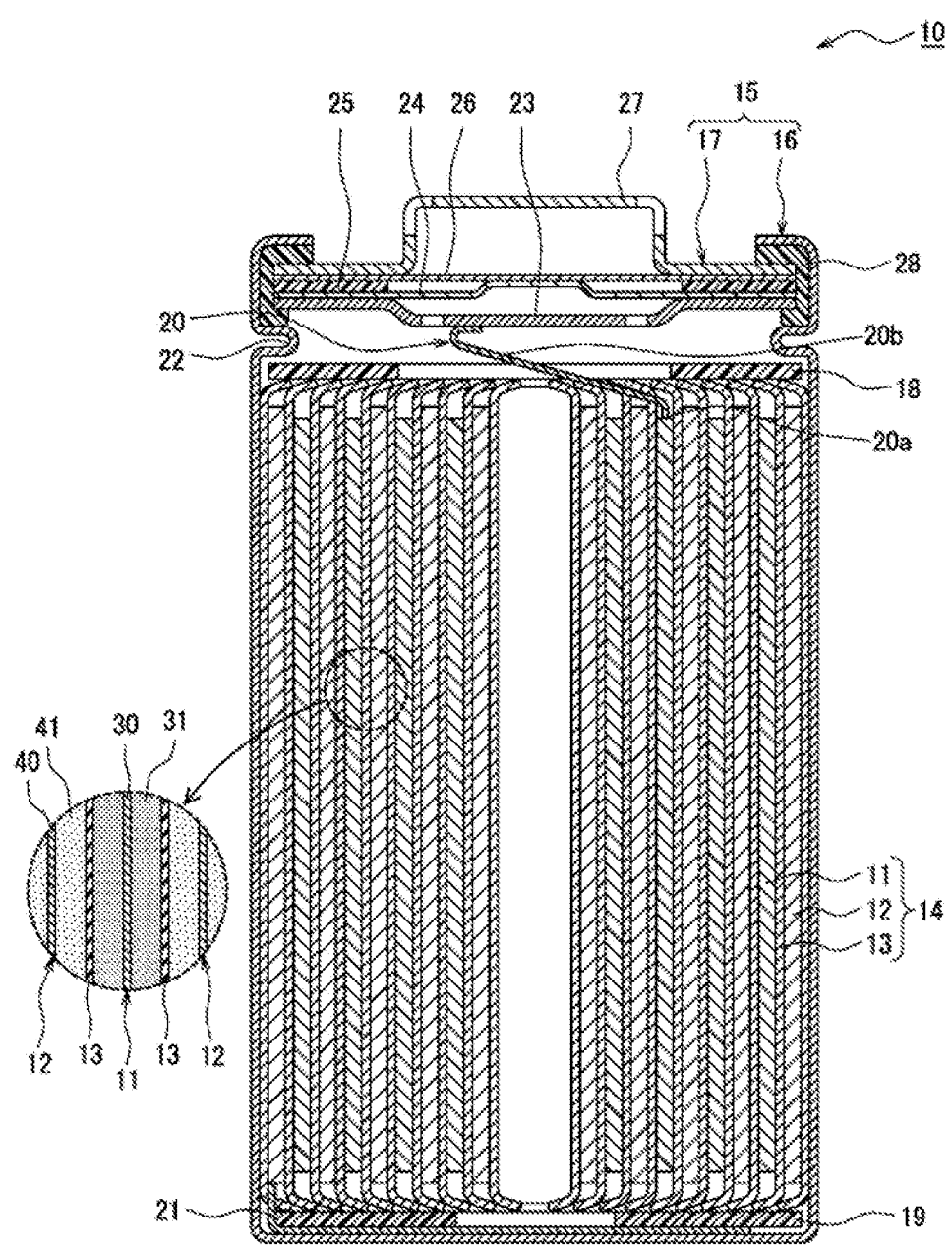
FIG. 1 is a cross-sectional diagram, in an axial direction, of a circular cylindrical secondary battery according to an embodiment of the present disclosure.

FIG. 1 is a cross-sectional diagram, in an axial direction, of a circular cylindrical secondary battery according to an embodiment of the present disclosure. A secondary battery 10 shown in FIG. 1 is an example of a lithium-ion secondary battery. The secondary battery of the present embodiment is not limited to a lithium-ion secondary battery, and may be any of other secondary batteries.

The secondary battery 10 shown in FIG. 1 comprises a rolled-type electrode assembly 14 in which a positive electrode 11 and a negative electrode 12 are rolled with a separator 13 therebetween, a non-aqueous electrolyte, insulating plates 18 and 19 placed respectively above and below the electrode assembly 14, a positive electrode lead 20, a negative electrode lead 21, an insulating member (not shown) which covers a part of the positive electrode lead 20, and a battery case 15 which houses these members. Alternatively, an insulating member which covers the negative electrode lead 21 may be provided.

In the electrode assembly 14, in order to prevent deposition of lithium at the negative electrode 12, the negative electrode 12 is formed to be larger than the positive electrode 11. More specifically, a length of the negative electrode 12 in an axial direction is greater than a length of the positive electrode 11 in an axial direction. In addition, a length of the negative electrode 12 in a longitudinal direction is greater than a length of the positive electrode 11 in a longitudinal direction. With this configuration, when the electrodes are rolled as the electrode assembly 14, a positive electrode active material layer 31 formed at least over a surface of a positive electrode current collector 30 is placed to oppose a negative electrode active material layer 41 formed over a surface of a negative electrode current collector 40, with the separator 13 therebetween. The electrode assembly 14 is not limited to the rolled type, and other forms may be applied such as, for example, a layered type in which the positive electrode 11 and the negative electrode 12 are alternately layered with the separator 13 therebetween.

The battery case 15 comprises, for example, a case body 16 having a circular cylindrical shape with a bottom and having an opening, and a sealing assembly 17 which seals the opening of the case body 16. The battery case 15 desirably has a gasket 28 provided between the case body 16 and the sealing assembly 17. With this configuration, airtightness inside the battery can be secured. The battery case 15 is not limited to the circular cylindrical shape, and may alternatively has, for example, a polygonal shape, a laminate shape, or the like.

The case body 16 has a protrusion 22, for example, which is formed by a part of a side surface portion protruding to an inner side, and which supports the sealing assembly 17. The protrusion 22 is desirably formed in an annular shape along a circumferential direction of the case body 16, and supports the sealing assembly 17 with an upper surface thereof.

The sealing assembly 17 has a structure in which a filter 23, a lower vent member 24, an insulator 25, an upper valve member 26, and a cap 27 are layered in this order from a side of the electrode assembly 14. The members of the sealing assembly 17 have, for example, a circular disk shape or a ring shape, and members other than the insulator 25 are electrically connected to each other. The lower vent member 24 and the upper valve member 26 are connected to each other at center parts thereof, and the insulator 25 is interposed between peripheral portions of the valve elements. When an inner pressure is increased due to heat generation caused by internal short-circuiting or the like, for example, the lower vent member 24 is deformed to press the upper valve member 26 upward to a side of the cap 27, and ruptures, so that a current path between the lower vent member 24 and the upper valve member 26 is disconnected. When the inner pressure further increases, the upper valve member 26 ruptures, and gas is discharged from an opening of the cap 27.

As will be described later, the positive electrode lead 20 has a one-end portion 20a and an extended portion 20b. The one-end portion 20a is connected to the positive electrode 11, and the extended portion 20b which extends from the one-end portion 20a to an outer side of the positive electrode 11 extends through a throughhole of the insulating plate 18 to the sealing assembly 17, and a tip of the extended portion 20b is connected to a lower surface of a filter 23 of the sealing assembly 17. With this configuration, the cap 27 which is electrically connected to the filter 23 serves as a positive electrode terminal.

The negative electrode lead 21 has one end connected to the negative electrode 12, and extends from the negative electrode 12 through an outer side of the insulating plate 19. The other end of the negative electrode lead 21 is connected to an inner surface of a bottom of the case body 16. With this configuration, the case body 16 serves as a negative electrode terminal. Alternatively, connection locations of the other ends of the positive electrode lead 20 and the negative electrode lead 21 may be reversed. For example, the other end of the positive electrode lead 20 may be connected to the case body 16, and the other end of the negative electrode lead 21 may be connected to the lower surface of the filter 23 of the sealing assembly 17.

The non-aqueous electrolyte contains a non-aqueous solvent, and an electrolyte salt dissolved in the non-aqueous solvent. For the non-aqueous solvent, for example, esters, ethers, nitriles, amides, and a mixture solvent of two or more of these may be employed.

The non-aqueous solvent may contain a halogen substituent in which at least a part of hydrogen of the solvent is substituted with a halogen atom such as fluorine. The non-aqueous electrolyte is not limited to a liquid electrolyte, and may alternatively be a solid electrolyte. For the electrolyte salt, for example, a lithium salt such as $LiPF_6$ may be employed.

Figure 2:
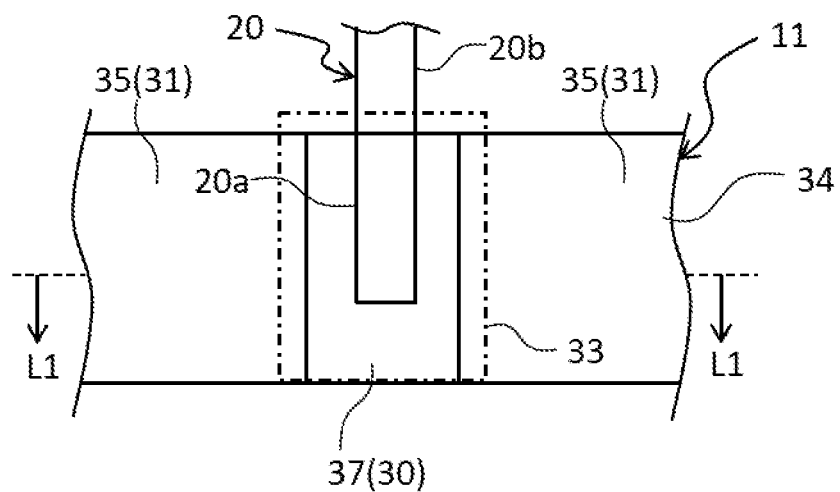
FIG. 2 is a partial top view, observing from a side of one surface of a positive electrode.
Figure 3:
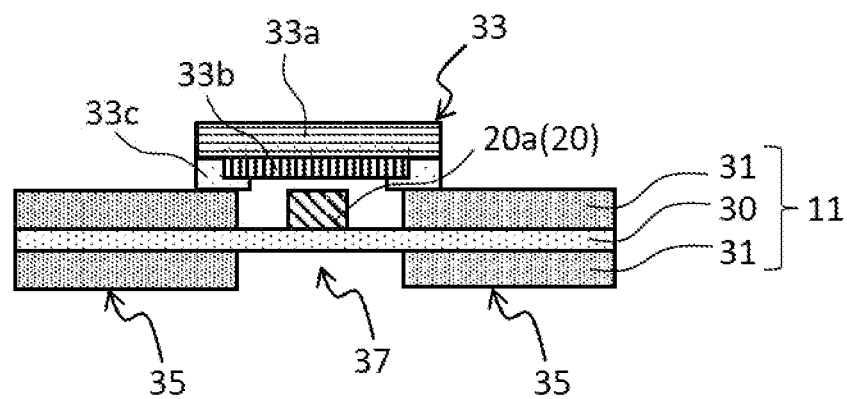
FIG. 3 is a cross-sectional diagram along a line L1-L1 of FIG. 2.

Structures of the positive electrode 11, the positive electrode lead 20, and an insulating member 33 which covers a part of the positive electrode lead 20 will now be described in detail with reference to FIGS. 2 and 3. FIG. 2 is a partial top view, observing from a side of one surface of the positive electrode 11, and FIG. 3 is a cross-sectional diagram along a line L1-L1 in FIG. 2. In FIG. 2, the insulating member 33 is shown in a transparent state and with a dot-and-chain line. In the following, "oppose" means that a surface and another surface contact each other, or that a surface and another surface face each other with a certain space therebetween.

The positive electrode 11 includes the positive electrode current collector 30, and a positive electrode active material layer 31 formed over at least one surface of the positive electrode current collector 30. At least one surface of the surfaces of the positive electrode 11 includes a layered portion 35 in which the positive electrode active material layer 31 is formed, and an exposed portion 37 in which the positive electrode current collector 30 is exposed. The exposed portion 37 shown in FIG. 3 is provided over both surfaces of the positive electrode 11, but alternatively, the exposed portion 37 may be provided only over one surface of the positive electrode 11. The exposed portion 37 may be at an approximate center part of the positive electrode 11 in a longitudinal direction.

The exposed portion 37 may be formed at any location of the positive electrode current collector 30, and may be formed, for example, at an end of the positive electrode current collector 30 in the longitudinal direction. The positive electrode active material layer 31 is desirably formed over both surfaces of the positive electrode current collector 30, but it is sufficient that the positive electrode active material layer 31 be formed over at least one surface of the positive electrode current collector 30.

For the positive electrode current collector 30, there may be employed a foil of a metal which is stable within a potential range of the positive electrode 11 such as aluminum, or a film on a surface layer of which the metal is placed. A thickness of the positive electrode current collector 30 is, for example, greater than or equal to 1 μm and less than or equal to 100 μm, and is desirably greater than or equal to 10 μm and less than or equal to 50 μm. The positive electrode active material layer 31 contains a positive electrode active material. In addition, the positive electrode active material layer 31 desirably contains, in addition to the positive electrode active material, a conductive agent and a binding agent. A thickness of the positive electrode active material layer 31 on one side of the positive electrode current collector 30 is, for example, greater than or equal to 30 μm and less than or equal to 120 μm, and is desirably greater than or equal to 50 μm and less than or equal to 90 μm.

As the positive electrode active material contained in the positive electrode active material layer 31, there may be exemplified a lithium-containing transition metal composite oxide or the like. More specifically, there may be employed lithium cobalt oxide, lithium manganate, lithium nickelate, lithium-nickel-manganese composite oxide, lithium-nickel-cobalt composite oxide, or the like. The lithium-containing transition metal composite oxide may be doped with Al, Ti, Zr, Nb, B, W, Mg, Mo, or the like.

As the conductive agent contained in the positive electrode active material layer 31, there may be exemplified carbon powders such as carbon black, acetylene black, Ketjen black, and graphite. These materials may be employed as a single entity or two or more of these materials may be combined.

As the binding agent contained in the positive electrode active material layer 31, there may be exemplified a fluorine-based polymer, a rubber-based polymer, and the like. For example, as the fluorine-based polymer, there may be exemplified polytetrafluoroethylene (PTFE), polyvinylidene fluoride (PVdF), or a modified product of these. As the rubber-based polymer, there may be exemplified a copolymer of ethylene-propylene-isoprene, a copolymer of ethylene-propylene-butadiene, or the like. These materials may be employed as a single entity or two or more of these materials may be combined.

The positive electrode 11 can be produced by applying a positive electrode active material slurry containing the positive electrode active material, the conductive agent, and the binding agent over a surface of the positive electrode current collector 30, drying the applied film, and then compressing with a roller or the like, to form the positive electrode active material layer 31 over both surfaces of the positive electrode current collector 30.

In FIG. 2, the positive electrode lead 20 has the one-end portion 20a connected to the exposed portion 37 of the positive electrode current collector 30, and an extended portion 20b which extends from the one-end portion 20a to an outer side of the positive electrode 11. No particular limitation is imposed on a connection method of the one-end portion 20a of the positive electrode lead 20 and the exposed portion 37 of the positive electrode current collector 30 so long as an electrical connection is secured. For example, ultrasonic welding or the like may be employed. The insulating member 33 may cover a part of the extended portion 20b of the positive electrode lead 20.

A material of the positive electrode lead 20 is desirably a metal such as aluminum and titanium, but there is no particular limitation imposed thereon. A thickness of the positive electrode lead 20 is, for example, greater than or equal to 50 μm and less than or equal to 300 μm, and is desirably greater than or equal to 100 μm and less than or equal to 200 μm.

In FIG. 3, the insulating member 33 has a base member portion 33a, a heat resistive portion 33b formed over a part of one surface of the base member portion 33a and containing an insulating inorganic material, and an adhesive portion 33c which covers at least a part of each of surfaces of the base member portion 33a and the heat resistive portion 33b. More specifically, a width of the heat resistive portion 33b is narrower than a width of the base member portion 33a, and the heat resistive portion 33b is provided at an approximate center of the base member portion 33a in a width direction. The adhesive portion 33c is provided on respective ends of the base member portion 33a in the width direction, and covers the surface of the heat resistive portion 33b at peripheries of respective ends in the width direction.

It is sufficient that the base member portion 33a is formed from an insulating resin, and, for example, there may be employed PPS (polyphenylene sulfide), PEEK (polyetherether ketone), PI (polyimide), PP (polypropylene), PET (polyethylene terephthalate), PBT (polybutylene terephthalate), or the like. A thickness of the base member portion 33a is, for example, greater than or equal to 5 μm and less than or equal to 50 μm, and is desirably greater than or equal to 10 μm and less than or equal to 30 μm.

The heat resistive portion 33b is a part for enhancing heat resistance of the insulating member 33 as a whole. The heat resistive portion 33b contains an insulating inorganic material, and may additionally contain a binding agent, from a viewpoint of mechanical strength or adhesiveness. The inorganic material may be, for example, metal oxides such as aluminum oxide, titanium oxide, zirconium oxide, silicon oxide, manganese oxide, magnesium oxide, and nickel oxide, metal hydroxides such as aluminum hydroxide, and magnesium hydroxide, metal sulfates such as barium sulfate, and calcium sulfate, metal phosphates such as lithium phosphate, and magnesium phosphate, metal nitrides such as titanium nitride, boron nitride, aluminum nitride, magnesium nitride, and silicon nitride, metal fluorides such as aluminum fluoride, lithium fluoride, sodium fluoride, magnesium fluoride, calcium fluoride, and barium fluoride, and metal carbides such as silicon carbide, boron carbide, titanium carbide, and tungsten carbide.

From a viewpoint of chemical stability with respect to the electrolyte or the like, the inorganic material desirably includes at least one of metal oxides, metal hydroxides, metal sulfates, or metal phosphates, which are insulating, and more desirably includes at least one of aluminum oxide, titanium oxide, magnesium oxide, aluminum hydroxide, magnesium hydroxide, barium sulfate, or lithium phosphate. Even when a foreign object intruding into the battery passes through the base member portion 33a and a part of the insulating member 33 is ruptured, because the heat resistive portion 33b having a high heat resistivity and containing the insulating inorganic material remains between the one-end portion 20a and the negative electrode 12, the internal short-circuiting can be suppressed.

Even if the foreign object penetrates through the insulating member 33 and reaches the one-end portion 20a, resulting in occurrence of the internal short-circuiting between the one-end portion 20a and the negative electrode 12, because the heat resistive portion 33b existing around the foreign object acts as a high-resistance element, heat generation of the battery due to the internal short-circuiting can be suppressed, and, consequently, an increase in the battery temperature can be suppressed.

A content of the inorganic material in the heat resistive portion 33b is desirably greater than or equal to 35 weight % and less than or equal to 99 weight %, and is more desirably greater than or equal to 50 weight % and less than or equal to 98 weight %. When the content of the inorganic material is greater than or equal to 35 weight %, the increase of the battery temperature due to the internal short-circuiting can be suppressed in comparison to the case with the content of the inorganic material of less than 35 weight %. Even with the content of the inorganic material of less than or equal to 99 weight %, a sufficient heat resistivity can be secured for the insulating member 33.

An average particle size of the inorganic material is desirably within a range of greater than or equal to 0.05 μm and less than or equal to 2 μm, from a viewpoint that the increase of the battery temperature due to the internal short-circuiting can be suppressed in a greater degree. Here, the average particle size is a volume average particle size measured by a laser diffraction method, and is a median size at which a volume accumulation value in a particle size distribution reaches 50%. The average particle size may be measured, for example, using a laser diffraction-scattering type particle size distribution measurement apparatus (manufactured by Horiba Ltd.).

The binding agent contained in the heat resistive portion 33b is desirably a material, for example, which dissolves in a solvent such as N-methyl-2-pyrrolidone (NMP) and water, and which is chemically stable in the positive electrode. For example, there may be exemplified polytetrafluoroethylene (PTFE), polyvinylidene fluoride (PVdF), polyacrylic acid, polyacrylonitrile, polyisobutylene, polyisoprene, or the like.

The heat resistive portion 33b may contain a polymer having an adhesive property. In other words, as the binding agent contained in the heat resistive portion 33b, a polymer with an adhesive property may be contained. By containing the polymer, the heat resistive portion 33b also contributes to the adhesion of the insulating member 33 and the positive electrode 11, in addition to the adhesive portion 33c to be described below. Thus, the adhesion strength between the insulating member 33 and the positive electrode 11 can be improved, and such a configuration is desirable.

The polymer may include at least one of an acryl-based polymer, an acrylonitrile-based polymer, or a rubber-based polymer.

A thickness of the heat resistive portion 33b is desirably greater than or equal to 1 μm and less than or equal to 30 μm, is more desirably greater than or equal to 5 μm and less than or equal to 25 μm, and is particularly desirably greater than or equal to 7 μm and less than or equal to 20 μm. By setting the thickness of the heat resistive portion 33b to a value greater than or equal to 1 μm, occurrence of the internal short-circuiting or the increase of the battery temperature when the insulating member 33 is ruptured by the foreign object can be suppressed in comparison to a case of the thickness of less than 1 μm. The heat resistive portion 33b having a thickness exceeding 30 μm may require reduction of a volume of other constituting members in order to house the electrode assembly 14 within the case body 16 having a predetermined size.

The adhesive portion 33c is a part for adhering the insulating member 33 to the surface of the positive electrode 11. Because the adhesive portion 33c substantially does not contain the insulating inorganic material, the adhesive portion 33c can firmly adhere the insulating member 33 to the positive electrode 11. A thickness of the adhesive portion 33c is, for example, greater than or equal to 1 μm and less than or equal to 30 μm, and is desirably greater than or equal to 5 μm and less than or equal to 25 μm.

The adhesive portion 33c may contain at least one of a rubber-based polymer or an acryl-based polymer. Because the rubber-based polymer and the acryl-based polymer has stickiness, the insulating member 33 can be adhered to the surface of the positive electrode 11. For example, a silicone-based polymer may be further added.

No particular limitation is imposed on a method of producing the insulating member 33 so long as the heat resistive portion 33b and the adhesive portion 33c described above can be formed over one surface of the base member portion 33a. For example, a slurry, in which an inorganic material and a binding agent are dispersed in a solvent such as the NMR may be applied on one surface of the base member portion 33a and may be dried, to form the heat resistive portion 33b. On a same surface of the base member portion 33a over which the heat resistive portion 33b is formed, an adhesive agent forming the adhesive portion 33c may be applied and may then be cut into a predetermined size, to produce the insulating member 33. Alternatively, the heat resistive portion 33b and the adhesive portion 33c may be produced over a surface of a provisional substrate, the heat resistive portion 33b and the adhesive portion 33c may be pasted over the surface of the base member portion 33a, and then, the provisional substrate may be removed, to produce the insulating member 33. In this case, desirably, the heat resistive portion 33b and the adhesive portion 33c are pasted after a surface process such as a corona process and a plasma process is applied over the surface of the base member portion 33a over which the heat resistive portion 33b and the adhesive portion 33c are to be pasted, from a viewpoint of the adhesiveness.

As shown in FIG. 3, the insulating member 33 is placed over the surface of the positive electrode 11 in such a manner that the heat resistive portion 33b opposes an outer surface of the one-end portion 20a of the positive electrode lead 20. With the heat resistive portion 33b opposing the outer surface of the one-end portion 20a, heat generation can be suppressed even when the internal short-circuiting occurs. Here, the outer surface of the one-end portion 20a of the positive electrode lead 20 refers to a surface other than a portion which contacts the exposed portion 37 of the positive electrode current collector 30. That is, when the positive electrode lead 20 has a flat plate shape as shown in FIGS. 2 and 3, the outer surface of the one-end portion 20a is formed from a primary surface opposing a surface which contacts the exposed portion 37 of the positive electrode current collector 30, and a pair of side surfaces which oppose each other. The shape of the positive electrode lead 20 is not limited to the flat plate shape, and may alternatively be a circular pillar shape or the like. In the case of the circular pillar shape or the like, the outer surface of the one-end portion 20a is a portion of an outer circumferential side surface of the shape of the circular pillar or the like, other than a portion which contacts the exposed portion 37.

As shown in FIG. 3, the insulating member 33 may be placed over the surface of the positive electrode 11 in such a manner that the heat resistive portion 33b opposes an entirety of the exposed portion 37. In other words, by widening the width of the heat resistive portion 33b, it becomes possible to make the heat resistive portion 33b oppose the outer surface of the one-end portion 20a and the entirety of the exposed portion 37. In this case, an entirety of the part, of the positive electrode plate surface, in which the meal is exposed, can be covered by the heat resistive portion 33b, and, therefore, the safety of the secondary battery 10 can be improved.

Alternatively, the insulating member 33 may be placed over the surface of the positive electrode 11 in such a manner that the heat resistive portion 33b opposes a part of the exposed portion 37. In other words, by setting the width of the heat resistive portion 33b to be wider than the width of the one-end portion 20a, the heat resistive portion 33b can oppose the outer surface of the one-end portion 20a and a part of the exposed portion 37. In this case, the exposed portion 37 may be covered by the heat resistive portion 33b in addition to the one-end portion 20a, and, consequently, the safety can be further improved.

As shown in FIG. 3, the adhesive portion 33c may be adhered to the positive electrode active material layer 31. By setting the width of the insulating member 33 to be wider than the exposed portion 37 of the positive electrode current collector 30, it becomes possible to adhere the adhesive portion 33c to the surface of the positive electrode active material layer 31 adjacent to the exposed portion 37. In this manner, the internal short-circuiting starting from a position on the exposed portion 37 may be suppressed, or the increase of the battery temperature may be suppressed even if the internal short-circuiting occurs. Because the positive electrode active material layer 31 has a rougher unevenness of the surface in comparison to the positive electrode lead 20 and the exposed portion 37, the insulating member 33 can be more firmly adhered to the positive electrode 11.

In FIG. 3, surfaces above and below the insulating member 33 are maintained in shapes parallel to the surface of the positive electrode 11. However, depending on a material and a thickness of the insulating member 33, the insulating member 33 may be flexible. In this case, the heat resistive portion 33b or the adhesive portion 33c may contact side surfaces of the one-end portion 20a in the up-and-down direction, or the exposed portion 37.

Next, with reference to FIG. 4, another example configuration of the insulating member 33 will be described.

Figure 4:
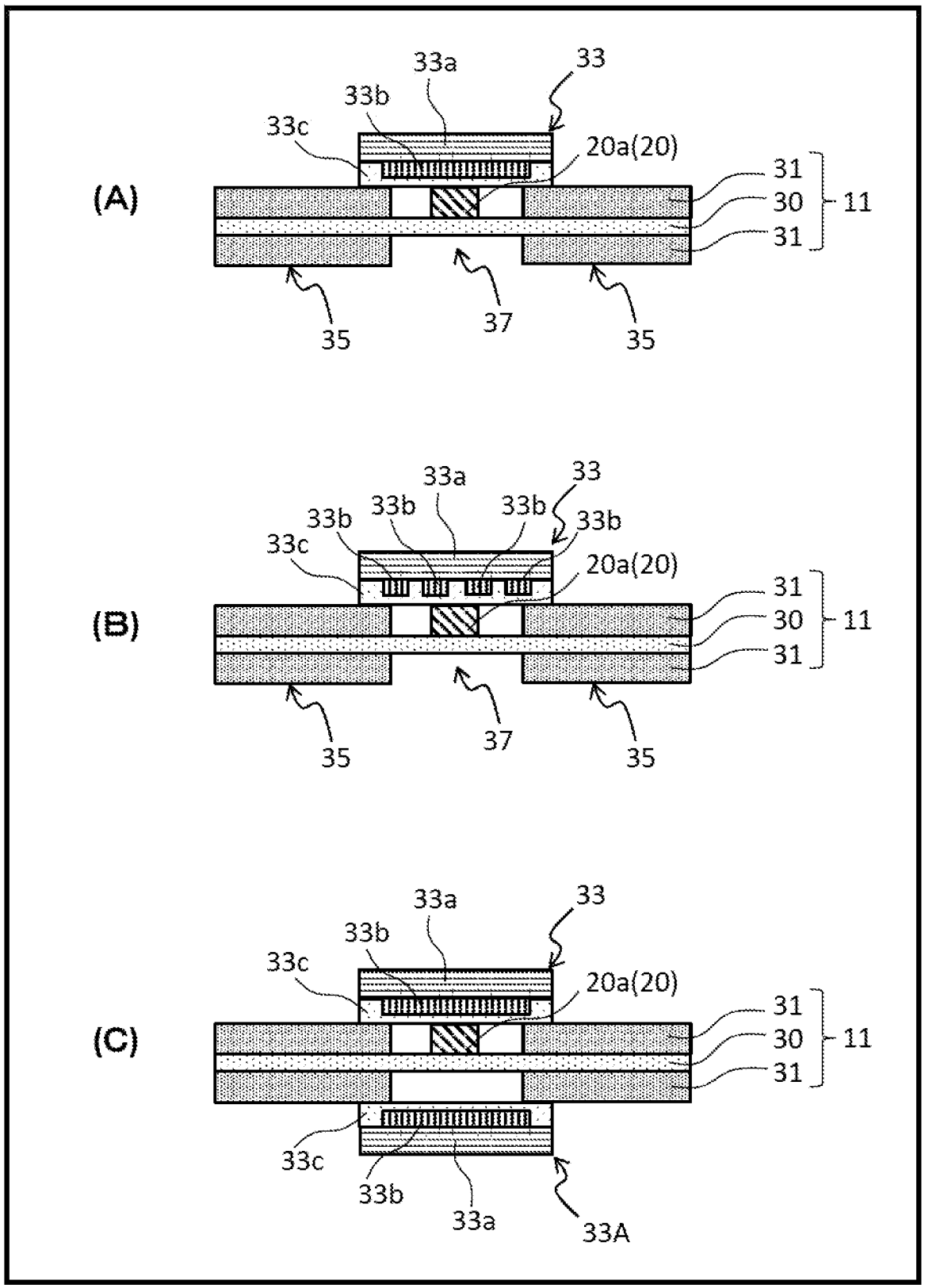
FIG. 4 is a diagram showing other examples of the insulating member in (A), (B), and (C).

As shown in (A) in FIG. 4, the adhesive portion 33c may cover an entirety of a surface of the heat resistive portion 33b. An area of contact between the adhesive portion 33c and the positive electrode 11 is increased, and the adhesion strength can be increased.

As shown in (B) in FIG. 4, the heat resistive portion 33b may have a shape of a single stripe or a plurality of stripes, and a longitudinal direction of the stripe shape may be parallel to a longitudinal direction of the one-end portion 20a. In this case, the adhesive portion 33c may cover an entirety of the surface of all heat resistive portions 33b or may only cover a part of the surface.

The heat resistive portion 33b may have a shape of a single spot or a plurality of spots. The shape of the spot may be any shape including a circle, a quadrangle, and other polygons. An arrangement of the spots may be regular or irregular. In addition, the adhesive portion 33c may cover the entirety of the surface of all heat resistive portions 33b, or may only cover a part of the heat resistive portion 33b.

As shown in (C) in FIG. 4, over a surface of the positive electrode 11 opposite from the surface of the positive electrode 11 over which the insulating member 33 is pasted, another insulating member 33A may be pasted. Desirably, with the use of two insulating members (33, 33A), the one-end portion 20a is sandwiched by the heat resistive portion 33b. That is, the secondary battery 10 may further comprise another insulating member 33A different from the insulating member 33, and comprising another base member portion 33a different from the base member portion 33a, another heat resistive portion 33b formed over a part of one surface of the other base member portion 33a and containing an insulating inorganic material, and another adhesive portion 33c which covers at least a part of each of surfaces of the other base member portion 33a and the other heat resistive portion 33b, wherein the other insulating member 33A may be placed over a surface of the positive electrode 11 not connected to the positive electrode lead 20, and the other heat resistive portion 33b may oppose a position corresponding to the one-end portion 20a. By protecting the one-end portion 20a with the heat resistive portion 33b also from the surface of the positive electrode 11 not connected to the positive electrode lead 20, the safety of the secondary battery 10 can further be improved.

Next, the negative electrode 12 and the separator 13 will be described.

The negative electrode 12 comprises a negative electrode current collector, and a negative electrode active material layer formed over the negative electrode current collector. For the negative electrode current collector, there may be employed a foil of a metal which is stable within a potential range of the negative electrode such as copper, a film on a surface layer of which the metal is placed, or the like. The negative electrode active material layer contains a negative electrode active material. The negative electrode active material layer desirably contains, in addition to the negative electrode active material, a thickener, and a binding agent.

As the negative electrode active material, a carbon material which can occlude and release lithium ions may be used. In addition to the graphite, non-graphitizable carbon, graphitizable carbon, fibrous carbon, coke, carbon black, or the like may be employed. In addition, as a non-carbon-based material, silicon, tin, and an alloy or an oxide primarily made of these substances may be employed.

For the binding agent, similar to the positive electrode, PTFE or the like may be employed, or styrene-butadiene rubber (SBR) or a modified product thereof may be employed. For the thickener, carboxymethyl cellulose (CMC) or the like may be employed.

For the separator 13, for example, a porous sheet having an ion transmissivity and insulating property is used. Specific examples of the porous sheet include a microporous membrane, a woven fabric, a non-woven fabric, or the like. For the material of the separator 13, desirably, an olefin-based resin such as polyethylene and polypropylene, cellulose, or the like is employed. Alternatively, the separator 13 may have a layered structure including a cellulose fiber layer and a thermoplastic resin fiber layer such as the olefin-based resin. Alternatively, the separator 13 may be a multilayer separator including a polyethylene layer and a polypropylene layer, or a structure may be employed in which a material such as an aramid-based resin, ceramic, or the like is applied over a surface of the separator.

EXAMPLES

Example 1

As a positive electrode active material, 100 parts by mass of a lithium-nickel-cobalt-aluminum composite oxide represented by $LiNi_{0.88}Co_{0.09}Al_{0.03}O_2$, 1 part by mass of acetylene black (AB), and 1 parts by mass of polyvinylidene fluoride (PVDF) were mixed, and a suitable amount of N-methyl-2-pyrrolidone (NMP) was further added, to prepare a positive electrode active material slurry. Then, the positive electrode active material slurry was applied on both surfaces of a positive electrode current collector formed from an aluminum foil, and was dried. The resulting structure was cut in a predetermined electrode size, and was rolled using a roller, to produce a positive electrode in which the positive electrode active material layer was formed on both surfaces of the positive electrode current collector. At an approximate center part of the positive electrode in a longitudinal direction, an exposed portion (with a width of 6 mm) was formed in which the positive electrode active material layer was not formed and the positive electrode current collector was exposed. To the formed exposed portion, a positive electrode lead made of aluminum and having a thickness of 150 μm and a width of 3.5 mm was joined by ultrasonic welding.

A slurry in which 35 weight % of aluminum oxide (having an average particle size of 2 μm) and PVDF serving as a polymer were dispersed in NMP was applied with a width of 7 mm over a PI film serving as a base member portion, and was dried, to form the heat resistive portion. In this process, an amount of application was adjusted such that the heat resistive portion had a thickness of 1 μm. Over a same surface of the PI film over which the heat resistive portion was formed, an acryl adhesive member serving as the adhesive portion was applied in a thickness of 7 μm, and then was cut in a width of 11 mm, to produce an insulating member. A cross section of the produced insulating member had a structure similar to (A) in FIG. 4, in which the entirety of the surface of the heat resistive portion is covered with the adhesive portion.

The insulating member was pasted in such a manner that the heat resistive portion of the insulating member was placed over an outer surface of the one-end portion of the positive electrode lead and the exposed portion. That is, the outer surface of the one-end portion of the positive electrode lead and the exposed portion were covered by the heat resistive portion of the placed insulating member.

Next, a thin-plate copper foil was employed as a negative electrode current collector, a graphite powder, carboxymethyl cellulose (CMC) serving as the thickener, and styrene-butadiene rubber (SBR) serving as the binding agent were dispersed in water with a respective weight ratio of 98:1:1, to produce a negative electrode active material slurry, the negative electrode active material slurry was applied over both surfaces of the electricity collecting element and was dried, and the resulting structure was compressed by a roll press to a predetermined thickness. At an end of the negative electrode in a longitudinal direction, an exposed portion was formed in which the negative electrode active material layer was not formed and the negative electrode current collector was exposed, and a negative electrode lead made of nickel was joined by ultrasonic welding to the exposed portion. The negative electrode lead over the exposed portion and the exposed portion were covered by an insulating tape formed from polypropylene film having a thickness of 25 μm.

The positive electrode and the negative electrode thus produced were rolled in a spiral shape with a separator therebetween, to produce a rolled-type electrode assembly.

For the separator, a structure was employed in which a heat resistive layer in which polyamide and an alumina filler were dispersed was formed over one surface of a microporous membrane made of polyethylene.

The electrode assembly described above was housed in a case body having a circular cylindrical shape with a bottom, with an outer size of 18 mm and a height of 65 mm. In this process, the other end of the positive electrode lead was welded to a sealing assembly, and the other end of the negative electrode lead was welded to the case body. The case body was filled with a non-aqueous electrolyte in which $LiPF_6$ was added in a concentration of 1 mol/L to a mixture solvent in which ethylene carbonate (EC), ethylmethyl carbonate (EMC), and diethyl carbonate (DEC) were mixed with a volume ratio of 3:3:4. Then, the opening of the case body was sealed by a gasket and the sealing assembly, to produce a non-aqueous electrolyte secondary battery of 18650 type and having a circular cylindrical shape.

Examples 2 to 12

Positive electrodes and secondary batteries were produced in manners similar to Example 1 except that a type and a content of the inorganic material contained in the heat resistive portion, and a thickness of the heat resistive portion were changed as shown in Table 1.

Comparative Example 1

A positive electrode and a secondary battery were produced in manners similar to Example 5 except that the adhesive portion was not provided.

Comparative Example 2

A positive electrode and a secondary battery were produced in manners similar to Example 1 except that the heat resistive portion was not provided.

[Battery Temperature in Internal Short-Circuiting Test]

For the secondary batteries of Examples and Comparative Examples, battery temperatures were measured with the secondary batteries being forcefully internally short-circuited. Each secondary battery was charged with a constant current at a current value of 500 mA and to a charge completion voltage of 4.2 V, and was charged with a constant voltage at 4.2 V for 60 minutes. A battery temperature during foreign object short-circuiting refers to a maximum reaching temperature when a foreign object (a small piece of nickel) was introduced on the insulating tape, and a temperature of a side portion of the battery when the battery was forcefully short-circuited was measured by a thermocouple according to JIS C 8714. Table 1 shows results for Examples and Comparative Examples.

[Peel-Off Evaluation of Insulating Member]

The positive electrodes of Examples and Comparative Examples were separately prepared. The insulating member was pasted over the exposed portion of the positive electrode, and the structure was left at 60° C. for one hour. Then, it was observed with human eyes whether or not the insulating member was peeled off from the positive electrode. Table 1 shows results for Examples and Comparative Examples.

TABLE 1

|  | Heat resistive portion | | | Battery temperature during internal short-circuiting (° C.) | Peeling off of insulating member |
|---|---|---|---|---|---|
|  | Inorganic material | Thickness | Content | | |
| Example 1 | Aluminum oxide | 1 μm | 35% | 55 | No |
| Example 2 |  | 1 μm | 50% | 37 | No |
| Example 3 |  | 1 μm | 98% | 28 | No |
| Example 4 |  | 7 μm | 35% | 41 | No |
| Example 5 |  | 7 μm | 50% | 25 | No |
| Example 6 |  | 7 μm | 98% | 25 | No |
| Example 7 |  | 30 μm | 35% | 33 | No |
| Example 8 |  | 30 μm | 50% | 25 | No |
| Example 9 |  | 30 μm | 98% | 25 | No |
| Example 10 | Magnesium hydroxide | 7 μm | 50% | 25 | No |
| Example 11 | Barium sulfate | 7 μm | 50% | 25 | No |
| Example 12 | Lithium phosphate | 7 μm | 50% | 25 | No |

TABLE 1-continued

|  | Heat resistive portion | | | Battery temperature during internal short-circuiting (° C.) | Peeling off of insulating member |
| --- | --- | --- | --- | --- | --- |
|  | Inorganic material | Thickness | Content | | |
| Comparative example 1 | Aluminum oxide | 7 μm | 50% | 55 | Yes |
| Comparative example 2 | None | N/A | N/A | 78 | No |

In the tests in which the batteries of Examples 1 to 12 and Comparative Examples 1 to 2 were forcefully internally short-circuited, the heat generation was reduced in Examples 1 to 12 in which the heat resistive portion was placed over the surface of the positive electrode to oppose the outer surface of the one-end portion, in comparison to Comparative Example 2 in which the heat resistive portion was not provided. It can be considered that, in the batteries of Examples 1 to 12, because the heat resistive portion was placed over the surface of the positive electrode to oppose the outer surface of the one-end portion of the positive electrode lead, deformation and alteration of the insulating member were suppressed by the heat resistive portion, and the increase in the battery temperature during foreign object short-circuiting was thus suppressed. In addition, no peeling off of the insulating member occurred in Examples 1 to 12. In Comparative Example 1 in which no adhesive portion was provided, peeling off from the positive electrode was observed in a part of the heat resistive portion. When the insulating tape peels off during the production of the electrode assembly, for example, a component of the insulating tape such as an adhesive agent may adhere to an unintended location on the electrode assembly and may become a foreign object. Therefore, the insulating tape desirably has a sufficient adhesion strength.

REFERENCE SIGNS LIST 10 secondary battery
11 positive electrode
12 negative electrode
13 separator
14 electrode assembly
15 battery case
16 case body
17 sealing assembly
18, 19 insulating plate
20 positive electrode lead
20a one-end portion
20b extended portion
21 negative electrode lead
22 protrusion
23 filter
24 lower vent member
25 insulator
26 upper vent member
27 cap
28 gasket
30 positive electrode current collector
31 positive electrode active material layer
33 insulating member
33a base member portion
33b heat resistive portion
33c adhesive portion
35 layered portion
37 exposed portion
40 negative electrode current collector
41 negative electrode active material layer.

The invention claimed is:

1. An insulating member which is placed to oppose a part of a positive electrode lead connected to a surface of a positive electrode, the insulating member comprising:
a base member portion being a substrate that has a pair of opposite major surfaces including one surface facing the positive electrode;
a heat resistive portion formed over a part of the one surface of the base member portion, and containing an insulating inorganic material; and
an adhesive portion which directly contacts at least a part of each of the one surface of the base member portion and a surface of the heat resistive portion facing the positive electrode,
wherein the substrate of the base member portion is formed of an insulating resin and is free of the insulating inorganic material therein, and
the adhesive portion is formed of an adhesive agent different from the insulating resin,
wherein
the adhesive portion directly contacts respective ends of the base member portion in a width direction,
the adhesive portion directly contacts surfaces of the heat resistive portion at peripheries of respective ends of the heat resistive portion in the width direction,
a width of the heat resistive portion is narrower than a width of the base member portion in the width direction,
the heat resistive portion is provided at an approximate center of the base member portion in the width direction, and
a content of the insulating inorganic material in the heat resistive portion is greater than or equal to 35 weight % and less than or equal to 99 weight %.

2. The insulating member according to claim 1, wherein the heat resistive portion contains a polymer having an adhesive property.

3. The insulating member according to claim 2, wherein the polymer includes at least one of an acryl-based polymer, an acrylonitrile-based polymer, or a rubber-based polymer.

4. The insulating member according to claim 1, wherein the insulating inorganic material includes at least one of a metal oxide, a metal hydroxide, a metal sulfate, or a metal phosphate.

5. The insulating member according to claim 1, wherein a thickness of the heat resistive portion is greater than or equal to 1 μm and less than or equal to 30 μm.

6. The insulating member according to claim 1, wherein the adhesive portion includes at least one of a rubber-based polymer or an acryl-based polymer.

7. The insulating member according to claim 1, wherein the adhesive portion covers an entirety of a surface of the heat resistive portion.

8. The insulating member according to claim 1, wherein the heat resistive portion has a shape of a single stripe or a plurality of stripes.

9. The insulating member according to claim 1, wherein the heat resistive portion has a shape of a single spot or a plurality of spots.

10. A secondary battery comprising:
a positive electrode; and
a positive electrode lead connected to the positive electrode, wherein
the positive electrode comprises a positive electrode current collector, and a positive electrode active material layer formed over at least one surface of the positive electrode current collector,
at least one surface of the positive electrode comprises a layered portion in which the positive electrode active material layer is formed, and an exposed portion in which the positive electrode current collector is exposed,
the positive electrode lead comprises a one-end portion connected to the exposed portion, and an extended portion which extends from the one-end portion to an outer side of the positive electrode,
the secondary battery further comprises the insulating member according to claim 1, and
the insulating member is placed over a surface of the positive electrode in such a manner that the heat resistive portion opposes an outer surface of the one-end portion.

11. The secondary battery according to claim 10, wherein the heat resistive portion has a shape of a single stripe or a plurality of stripes, and a longitudinal direction of the stripe shape is parallel to a longitudinal direction of the one-end portion.

12. The secondary battery according to claim 10, wherein the insulating member is placed over a surface of the positive electrode in such a manner that the heat resistive portion opposes an entirety of the exposed portion.

13. The secondary battery according to claim 10, wherein the insulating member is placed over a surface of the positive electrode in such a manner that the heat resistive portion opposes a part of the exposed portion.

14. The secondary battery according to claim 10, wherein the adhesive portion of the insulating member is adhered to the positive electrode active material layer.

15. The secondary battery according to claim 10, further comprising:
another insulating member different from the insulating member, and comprising another base member portion different from the base member portion, another heat resistive portion formed over a part of one surface of the other base member portion and containing an insulating inorganic material, and another adhesive portion which covers at least a part of each of surfaces of the other base member portion and the other heat resistive portion, wherein
the other insulating member is placed over a surface, of the positive electrode, which is not connected to the positive electrode lead, and the other heat resistive portion opposes a position corresponding to the one-end portion.

16. The insulating member according to claim 1, wherein the width of the heat resistive portion is narrower than a width of the adhesive portion in the width direction.

17. The insulating member according to claim 1, wherein a width of the adhesive portion is narrower than the width of base material portion in the width direction.

\* \* \* \* \*